July 11, 1950     F. F. KISHLINE     2,515,011
CENTRIFUGAL CLUTCH MECHANISM

Filed Oct. 25, 1945     2 Sheets-Sheet 1

INVENTOR
FLOYD F. KISHLINE

BY Carl J. Barbee

HIS ATTORNEY

July 11, 1950     F. F. KISHLINE     2,515,011
CENTRIFUGAL CLUTCH MECHANISM
Filed Oct. 25, 1945     2 Sheets-Sheet 2

FLOYD F. KISHLINE
INVENTOR.

BY Carl J. Barbee

HIS ATTORNEY.

Patented July 11, 1950

2,515,011

UNITED STATES PATENT OFFICE 2,515,011

CENTRIFUGAL CLUTCH MECHANISM

Floyd F. Kishline, Kenosha, Wis., assignor to Nash-Kelvinator Corporation, Kenosha, Wis., a corporation of Maryland Application October 25, 1945, Serial No. 624,485

2 Claims. (Cl. 192—53)

This invention relates to improvements in centrifugal clutch mechanisms and more particularly to centrifugal synchronizer clutches for power transmissions although the invention is not necessarily limited to such use.

It is an object of this invention to provide a synchronizer device for the power transmission which will multiply the synchronizing effort according to the speed of the driving and driven elements of the transmission.

It is a further object of this invention to provide a centrifugal synchronizer for a power transmission which is very simple in design and very economical to manufacture.

It is a further object of this invention to provide a centrifugal synchronizing device for a power transmission wherein the effort required to shift the gears of said transmission will be proportioned to the speed of the elements of said transmission.

Further objects and advantages of this invention will be apparent from a consideration of the following description and claims and the attached drawings, of which there are two sheets and in which like reference characters are used to designate like parts, and in which:

Figure 1:
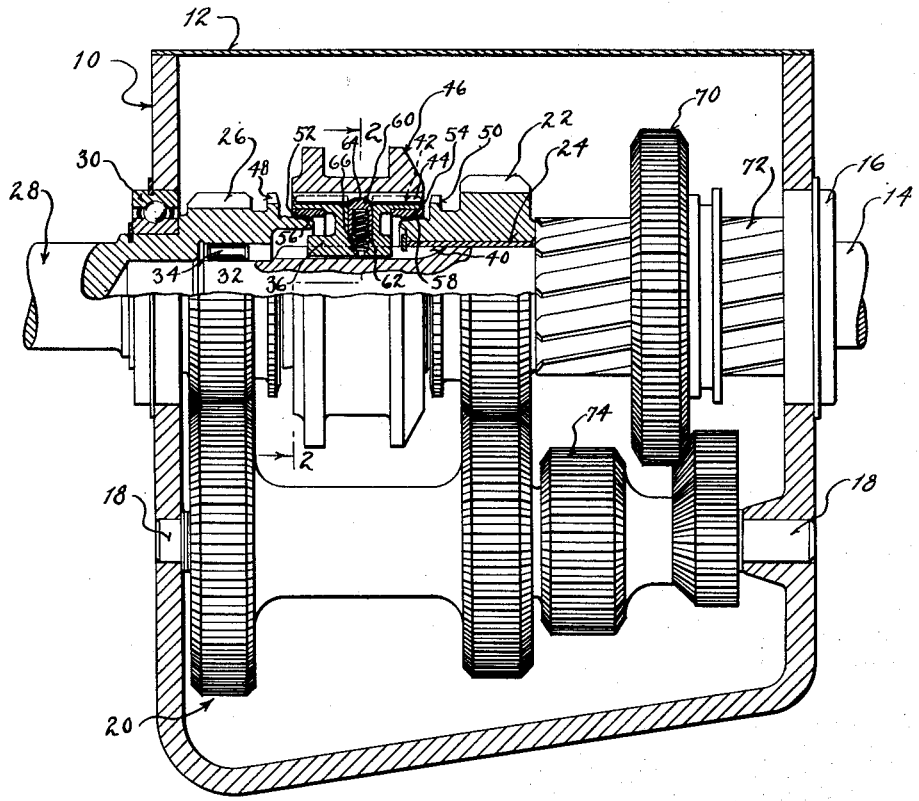
Figure 1 is a side elevation, partially in section, of an automotive transmission showing the invention in its neutral or starting position.

In Figure 1 is illustrated the conventional type of automotive transmission known to the art at the present time having a case 10 which is secured to the back of the bell clutch housing (not shown). Transmission case 10 is provided with a cover 12 and the transmission within case 10 consists of a main shaft 14 journaled in a ball bearing 16 which is secured in the rear wall of case 10 and a countershaft 18 parallel with said main shaft and mounted in the walls of case 10.

Rotatively supported upon the countershaft 18 is the usual countershaft gear cluster generally indicated at 20, one of the gears of which is in constant mesh with intermediate speed gear 22 which is rotatively supported upon main shaft 14 by a bearing 24.

Another gear of gear cluster 20 is in constant engagement with gear 26 which is formed on clutch shaft 28. Shaft 28 is journaled in the ball bearing 30 which is secured in the forward end of casing 10. The forward end 32 of main shaft 14 extends into a blind hole in the rearward end of clutch shaft 28 and is journaled therein in roller bearings 34.

A synchronizer mechanism is mounted on main shaft 4 and is comprised of an internally splined hub 36 telescopically positioned around and in driving engagement with splined portion 40 of main shaft 14. The outer periphery of hub 36 is defined by gear teeth 42 which are in engagement with the teeth 44 of internally toothed collar 46 which is adapted to be moved forwardly or rearwardly into engagement with other toothed means.

The toothed means adapted to be engaged by collar 46 consist of a high speed clutch gear 48 formed on clutch shaft 28 and an intermediate clutch gear 50 formed on gear 22. To facilitate engagement of collar 46 with gears 48 and 50, hub 36 is provided with synchronizing means consisting of a pair of clutch cones 52 and 54 secured thereto. Cone 52 is adapted to engage clutch surface 56 of clutch shaft 28 and cone 54 is adapted to engage clutch surface 58 formed on the forward side of gear 22.

Within a radially extending peripheral groove 66 formed in hub 36 is positioned a series of spring pressed centrifugal members 60 which are constantly urged outwardly by compression spring 62 into grooves 64 formed opposite said members 60 in the teeth 44 of collar 46. When the transmission is in its neutral position as shown in Figure 1, said members 60 will be held in engagement with grooves 64 by the springs 62, at which time the engine is usually functioning at idling speed and therefore very little synchronizing effort is required to bring shaft 28 and main shaft 14 to the same speed at which collar 46 may engage either gear 48 or gear 50 without injury to said collar or gears.

The members 60 when in engagement with grooves 64 resist the movement of collar 46 in either direction toward its engagement with either gear 48 or gear 50 and thereby hub 36 is moved with collar 46, which causes clutch cone 52 to engage surface 56 if collar 46 is moved toward engagement with gear 48 or causes clutch cone 54 to engage surface 58 if collar 46 is moved toward engagement with gear 50.

Figure 2:
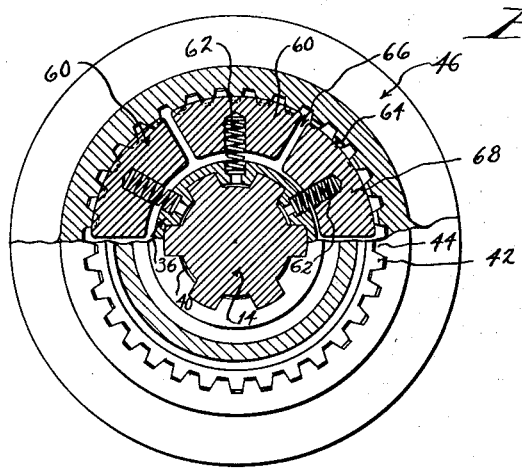
Figure 2 is a view of the invention taken along the lines 2—2 of Figure 1 and looking in the direction of the arrows.

When the said clutch cones engage these surfaces, an additional shifting energy is applied to collar 46 and members 60 will be moved inwardly in groove 66 as they are forced out of engagement with the grooves 64 of collar 46. The position members 60 will assume when grooves 64 are moved out of alignment therewith is shown by one of said members indicated as 68 of Figure 2. The other members 60 of Figure 2 are shown in the normal or neutral position as in Figure 1.

As the rotative speed of main shaft 14 is increased, the members 60 will be propelled outwardly due to centrifugal force and thereby the effort necessary to shift grooves 64 out of engagement with said members 60 will be multiplied so that clutch cones 52 and 54 will be pushed harder into engagement with the surfaces 56 and 58 before collar 46 will be permitted to move on hub 36 into engagement with either gear 48 or gear 50 and thus the synchronizing effort will be multiplied.

This is desirable because when the car is started, gear 70, which is telescopically positioned on splined portion 72 of main shaft 14 and in driving engagement therewith, will be moved into engagement with gear 74 of gear cluster 20 to move the automobile forward in "low" gear and thereby main shaft 14 will be rotated at an increasing speed until the operator wishes to engage second intermediate gear, at which time gear 70 will be moved back to the neutral position shown and collar 46 will be moved rearwardly toward engagement with gear 50. As the rotative speed of main shaft 14 and collar 46 has increased, it will take an added amount of effort to synchronize the speed of collar 46 and the rotative speed of gear 50, which is necessary due to the increasing speeds thereof.

When said gears are in engagement, the customary procedure is for the operator to again accelerate the automobile and increase the speed further until he wishes to shift the transmission to "high" gear, at which time collar 46 will be moved from engagement with gear 50 to neutral position as shown in Figure 1 and members 60 will again engage grooves 64. Continued shifting energy exerted by the operator to move collar 46 into engagement with gear 48 will tend to depress members 60 into groove 66. At this time, the speeds of main shaft 14 and clutch shaft 28 are normally very high and therefore a great deal of energy is necessary to synchronize the speeds of said shafts. This additional energy is provided by the increase of centrifugal force moving members 60 outwardly into grooves 64 due to the relatively high speed of main shaft 14. In this manner, clutch cone 52 will have to be moved into very firm engagement with surface 56 before collar 46 will be permitted to move over hub 36, thus providing the necessary synchronizing effect.

In the manner described above, applicant's invention makes use of centrifugal poppet means which engage the clutch collar with increasing force as the rotative speeds of the clutch shaft and the main shaft are increased and thereby provides greater synchronizing energy between said shafts when they are rotating at increased speeds and therefore require such additional synchronizing effort.

Figure 3:
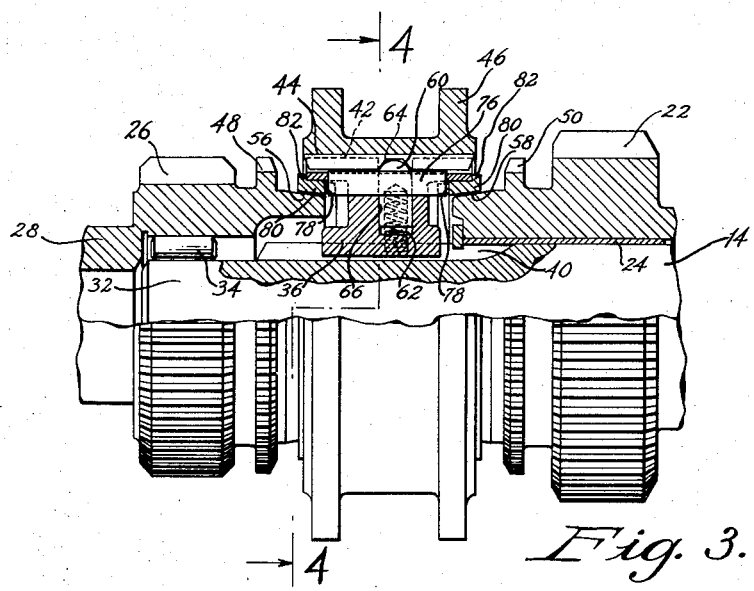
Figure 3 is a side elevation of a portion of an automobile transmission, partially in section, showing a modification of applicant's invention.
Figure 4:
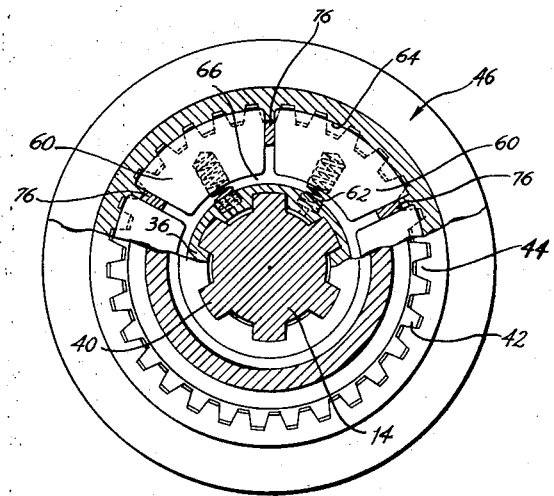
Figure 4 is a view of the invention shown in Figure 3 taken along the lines 4—4 of Figure 3 and looking in the direction of the arrows.

The modification of applicant's invention as shown in Figures 3 and 4 is comprised of a series of driving pins 76 positioned within axially extending grooves in the outer periphery of the hub 36 and between the centrifugal members 60 to space said members from each other. The outer ends of pins 76 extend into notches 78 formed in clutch cones 80 and thereby said clutch cones are driven by the hub 36 through their engagement with pins 76. Each of said cones 80 has an outwardly extending flange 82 which abuts hub 36 so that cones 80 are moved axially when hub 36 is moved in a like manner. When cones 80 are driven in the manner described, they may be of a free floating type; i. e., they are not rigidly secured to the hub 36 and therefore will more readily fit the contour of the surfaces 56 and 58 than will such cones when rigidly secured to the synchronizer hub.

The operation of the invention as shown in Figure 3 is identical to that of the invention shown in Figure 1. To Figure 3, applicant has merely added another means of controlling the clutch cones 80. The centrifugal means of Figures 3 and 4 operate in an identical manner to those of Figures 1 and 2. However, in the modification of Figures 3 and 4 the centrifugal means are provided with the means 76 to space them apart.

While I have described my invention in some detail, I intend this description to be an example only and not a limitation of my invention, to which I make the following claims:

1. In a power transmission, a drive mechanism, a pair of jaw clutch elements formed on said drive mechanism, a clutch surface formed on said drive mechanism adjacent each jaw clutch element, a driven shaft, a synchronizer mechanism drivingly positioned on said shaft between said clutch surfaces and comprising an axially movable hub member telescopically positioned around said driven shaft and drivingly associated therewith, a collar axially movable into direct engagement with said jaw clutch elements surrounding said hub and in constant driving engagement therewith, a peripheral groove in the outer surface of said hub, a plurality of centrifugal members positioned in said groove and adapted to extend outwardly into frictional engagement with said collar for restricting the axial movement thereof, a friction clutch element positioned between each clutch surface and said hub for frictionally connecting said surfaces and said hub, a series of notches in said clutch elements, a series of axially extending depressions in the outer periphery of said hub, and a rigid member positioned in each of said depressions and extending therefrom into the notches in said clutch elements for rotating said elements.

2. In a power transmission, a drive mechanism, a pair of jaw clutch elements formed on said drive mechanism, a clutch surface formed adjacent each jaw clutch element, a driven shaft, a mechanism telescopically positioned on said driven shaft and rotated thereby for synchronizing the speeds of rotation of said drive mechanism and said driven shaft, said synchronizing mechanism comprising a hub member drivingly connected to said driven shaft and axially movable thereon, a pair of friction clutch elements adjacent said hub and axially movable thereby into engagement with said clutch surfaces forming a frictional driving connection between said hub and said surfaces, notches formed in said clutch elements, a collar axially movable into direct engagement with said jaw clutch elements positioned around the outer periphery of said hub and drivingly connected thereto, a radially extending groove formed in the outer periphery of said hub, a series of centrifugal members positioned in said groove and adapted to extend outwardly therefrom into engagement with said collar to restrain axial movement thereof, a series of axially extending depressions in the outer periphery of said hub, and a rigid member positioned in each of said depressions between each of said centrifugal members for spacing said members apart and extending from the depressions into the notches in said clutch elements for drivingly connecting the same with said hub.

FLOYD F. KISHLINE.

REFERENCES CITED

The following references are of record in the file of this patent:

UNITED STATES PATENTS

| Number | Name | Date |
|---|---|---|
| 1,916,126 | Nardone | June 27, 1933 |
| 1,935,965 | Wahlberg | Nov. 21, 1933 |
| 2,043,692 | Barton | June 9, 1936 |
| 2,221,895 | White | Nov. 19, 1940 |
| 2,221,900 | White et al. | Nov. 19, 1940 |